United States Patent
Kuroda et al.

(10) Patent No.: US 10,317,116 B2
(45) Date of Patent: Jun. 11, 2019

(54) VEHICULAR AIR-CONDITIONING DEVICE, AND CONSTITUENT UNITS OF SAME

(71) Applicant: Panasonic Intellectual Property Management Co., Ltd., Osaka (JP)

(72) Inventors: Kentaro Kuroda, Kanagawa (JP); Ichiro Tateno, Gunma (JP); Yoshitoshi Noda, Kanagawa (JP); Katsuji Taniguchi, Kanagawa (JP); Yuji Kodera, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 561 days.

(21) Appl. No.: 15/023,678

(22) PCT Filed: Nov. 10, 2014

(86) PCT No.: PCT/JP2014/005632
§ 371 (c)(1),
(2) Date: Mar. 22, 2016

(87) PCT Pub. No.: WO2015/072126
PCT Pub. Date: May 21, 2015

(65) Prior Publication Data
US 2016/0209092 A1 Jul. 21, 2016

(30) Foreign Application Priority Data

Nov. 13, 2013 (JP) .................................. 2013-235289
Mar. 18, 2014 (JP) .................................. 2014-055101

(51) Int. Cl.
*B60H 1/00* (2006.01)
*F25B 41/00* (2006.01)
(Continued)

(52) U.S. Cl.
CPC .......... *F25B 41/00* (2013.01); *B60H 1/00342* (2013.01); *B60H 1/00899* (2013.01);
(Continued)

(58) Field of Classification Search
CPC .......... F25B 41/00; F25B 30/02; F25B 41/04; F25B 29/00; F25B 5/02; F25B 6/02;
(Continued)

(56) References Cited

U.S. PATENT DOCUMENTS 6,332,497 B1 * 12/2001 Niwa ................. B60H 1/00007
165/204
9,809,081 B2 * 11/2017 Suzuki ..................... F25B 5/00
(Continued)

FOREIGN PATENT DOCUMENTS

JP 61-089115 5/1986
JP 6-068919 U 9/1994
(Continued)

OTHER PUBLICATIONS

Extended European Search Report issued in Patent Application No. EP 14 86 1488 dated Feb. 17, 2017.
(Continued)

*Primary Examiner* — Claire E Rojohn, III
(74) *Attorney, Agent, or Firm* — Pearne & Gordon LLP

(57) ABSTRACT

A vehicular air-conditioning device includes a first water-refrigerant heat exchanger and a second water-refrigerant heat exchanger. The first water-refrigerant heat exchanger exchanges heat between a refrigerant of low-temperature and low-pressure and a heat transfer coolant to vaporize the refrigerant. The second water-refrigerant heat exchanger exchanges heat between the refrigerant of high-temperature and high-pressure and the coolant to condense the refrigerant. The coolant circulates through one of the first water-refrigerant heat exchanger and the second water-refrigerant
(Continued)

heat exchanger, the other of the first water-refrigerant heat exchanger and the second water-refrigerant heat exchanger, a cooling path for cooling a heat generating component of a vehicle, and a heater core for heating air supplied to a vehicle interior in this order.

22 Claims, 12 Drawing Sheets

(51) Int. Cl.
    *F25B 29/00*     (2006.01)
    *F25B 41/04*     (2006.01)
    *B60H 1/08*     (2006.01)
    *F25B 30/02*     (2006.01)
    *F25B 6/02*     (2006.01)
    *F25B 5/02*     (2006.01)

(52) U.S. Cl.
    CPC ............... *B60H 1/08* (2013.01); *F25B 29/00* (2013.01); *F25B 30/02* (2013.01); *F25B 41/04* (2013.01); *B60H 2001/00928* (2013.01); *F25B 5/02* (2013.01); *F25B 6/02* (2013.01); *F25B 2339/02* (2013.01); *F25B 2339/047* (2013.01); *F25B 2600/0251* (2013.01)

(58) Field of Classification Search
    CPC .......... F25B 2339/02; F25B 2600/0251; F25B 2339/047; B60H 1/00342; B60H 1/08; B60H 1/00899; B60H 2001/00928
    See application file for complete search history.

(56) References Cited

U.S. PATENT DOCUMENTS

| | | | |
|---|---|---|---|
| 2002/0043413 A1* | 4/2002 | Kimishima | B60H 1/323 180/68.1 |
| 2008/0041071 A1 | 2/2008 | Itoh | |
| 2010/0281901 A1* | 11/2010 | Kawase | B60H 1/00885 62/238.7 |
| 2012/0017637 A1* | 1/2012 | Nakajo | B60H 1/03 62/515 |
| 2012/0279243 A1* | 11/2012 | Endo | B60H 1/00921 62/238.6 |
| 2012/0318015 A1* | 12/2012 | Motegi | B60H 1/3208 62/230 |
| 2016/0209092 A1* | 7/2016 | Kuroda | F25B 29/00 |
| 2017/0217287 A1* | 8/2017 | Kuroda | B60H 1/03 |

FOREIGN PATENT DOCUMENTS

| | | |
|---|---|---|
| JP | 10-076837 | 3/1998 |
| JP | 2006-321389 | 11/2006 |
| JP | 2010-159006 | 7/2010 |
| JP | 2012-001141 | 1/2012 |
| JP | 2013-001172 | 1/2013 |

OTHER PUBLICATIONS

International Search Report of PCT application No. PCT/JP2014/005632 dated Feb. 10, 2015.

\* cited by examiner

VEHICULAR AIR-CONDITIONING DEVICE, AND CONSTITUENT UNITS OF SAME

TECHNICAL FIELD

The present disclosure relates to a vehicular air-conditioning device, and constituent units of this vehicular air-conditioning device.

BACKGROUND

A conventional vehicular heating device is often constituted by a hot water heater which heats a vehicle interior by utilizing a high-temperature engine coolant. Unexamined Japanese Patent Publication No. 10-76837 discloses a vehicular air-conditioning device developed from an existing hot water heater. This vehicular air-conditioning device additionally includes a structure for heating a coolant of a hot water heater by utilizing a heat pump to achieve higher heating performance than the existing hot water heater. According to the vehicular air-conditioning device of Unexamined Japanese Patent Publication No. 10-76837, a coolant for cooling an engine is configured to pass through a condenser, a heater core, and an evaporator in this order as a serial flow. The coolant having passed through these components is again introduced into the engine. The vehicular air-conditioning device of Unexamined Japanese Patent Publication No. 10-76837 further heats the engine coolant at the condenser by utilizing a refrigerant discharged from a compressor to improve heating performance.

SUMMARY

A vehicular air-conditioning device according to an aspect of the present disclosure is mounted on a vehicle that includes a heater core for heating air supplied to a vehicle interior, a heat generating component, and a cooling path for cooling the heat generating component. The vehicular air-conditioning device includes a first water-refrigerant heat exchanger and a second water-refrigerant heat exchanger. The first water-refrigerant heat exchanger exchanges heat between a refrigerant of low-temperature and low-pressure and a coolant to vaporize the refrigerant. The second water-refrigerant heat exchanger exchanges heat between the coolant and the refrigerant of high-temperature and high-pressure discharged from a compressor for compressing the refrigerant to condense the refrigerant. The coolant circulates through one of the first water-refrigerant heat exchanger and the second water-refrigerant heat exchanger, the other of the first water-refrigerant heat exchanger and the second water-refrigerant heat exchanger, the cooling path for cooling the heat generating component, and the heater core in this order.

According to this structure, the coolant having a lowered temperature after passing through the heater core and one of the first water-refrigerant heat exchanger and the second water-refrigerant heat exchanger is introduced into the other of the first water-refrigerant heat exchanger and the second water-refrigerant heat exchanger. By introduction of the coolant having a lowered temperature, the coolant introduced into the other of the first water-refrigerant heat exchanger and the second water-refrigerant heat exchanger is given a sufficient amount of heat. Accordingly, heating performance improves.

DESCRIPTION OF EMBODIMENTS

Before describing exemplary embodiments of the present disclosure, problems of a conventional vehicle air-conditioning device are touched upon. A normal vehicular air-conditioning device suppresses a rise in a pressure of a refrigerant discharged from a compressor (discharge pressure) by ON-OFF control of the compressor when the discharge pressure reaches or exceeds a predetermined pressure. This control is performed to protect the compressor. There is a correlation between a temperature of a coolant passing through a condenser and the discharge pressure of the compressor. More specifically, the discharge pressure of the compressor increases as the temperature of the coolant passing through the condenser becomes higher.

According to the vehicular air-conditioning device of Unexamined Japanese Patent Publication No. 10-76837, an engine coolant having a high temperature is directly introduced into the condenser. In this case, the discharge pressure of the compressor may reach the predetermined pressure before a sufficient amount of heat is given to the coolant at the condenser. Accordingly, there is a limitation of the heating performance in the conventional vehicular air-conditioning device.

Hereinafter, a vehicular air-conditioning device capable of increasing an amount of heat given to a coolant at a condenser to improve heating performance is described according to exemplary embodiments of the present disclosure.

First Exemplary Embodiment

Figure 1:
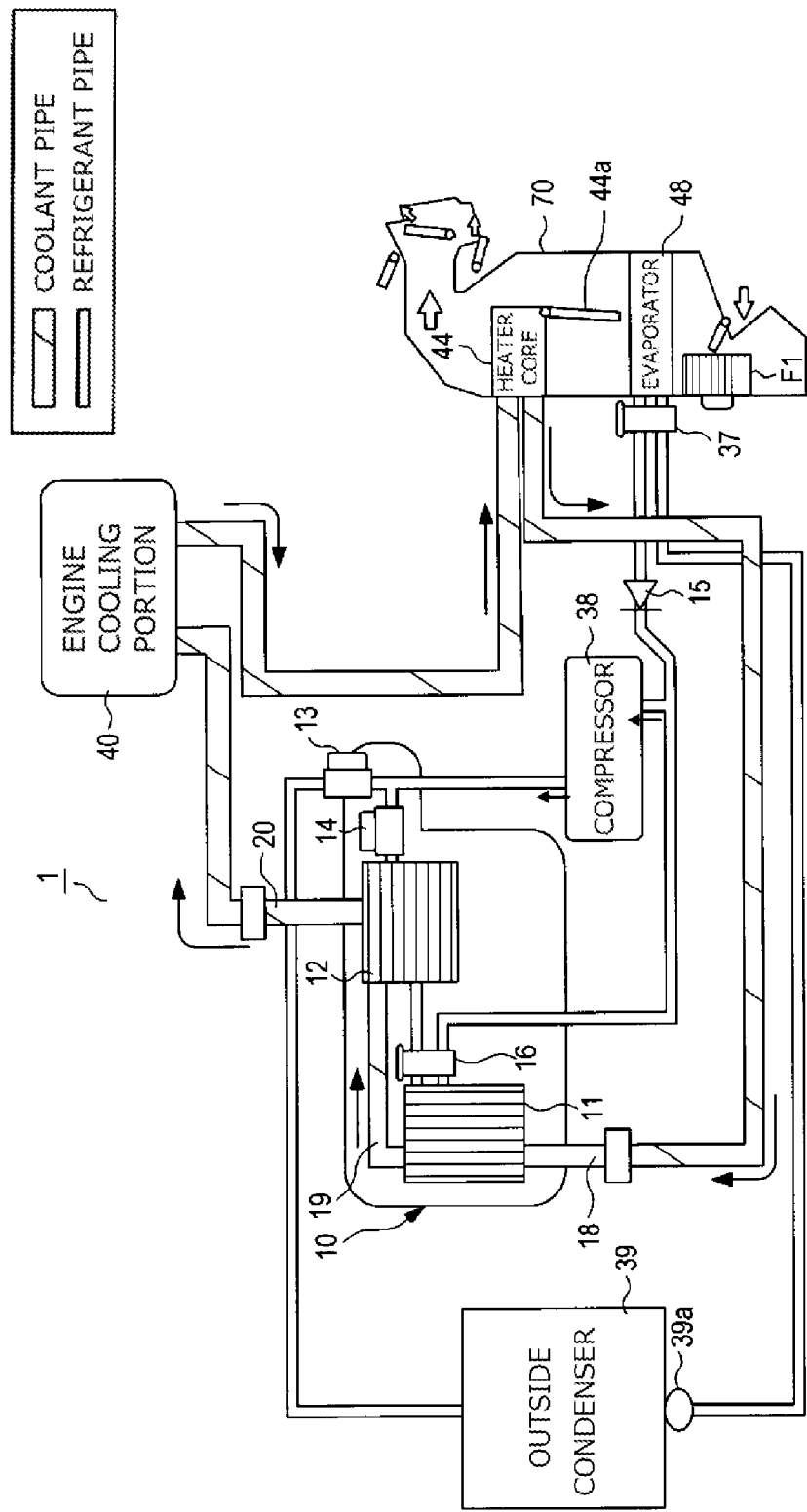
FIG. 1 is a configuration diagram illustrating a vehicular air-conditioning device according to a first exemplary embodiment of the present disclosure.

FIG. 1 is a configuration diagram illustrating a vehicular air-conditioning device according to a first exemplary embodiment of the present disclosure.

Vehicular air-conditioning device 1 according to the first exemplary embodiment of the present disclosure is a device mounted on a vehicle including an engine (internal combustion engine) as a heat generating component. Vehicular air-conditioning device 1 performs air conditioning in a vehicle interior.

Vehicular air-conditioning device 1 according to the first exemplary embodiment includes constituent unit 10, compressor 38, engine cooling portion 40, heater core 44, evaporator 48, expansion valve 37 which is corresponding to a second expansion unit, outside condenser 39, check valve 15, coolant pipe and refrigerant pipe connecting these components, and others. Heater core 44 and evaporator 48 are disposed within an intake air path of HVAC (Heating, Ventilation, and Air Conditioning) 70. HVAC 70 includes fan F1 for generating a flow of intake air.

Compressor 38 is driven electrically or by power of the engine to compress a sucked refrigerant into a high-temperature and high-pressure refrigerant, and discharge the compressed refrigerant. The high-temperature and high-pressure refrigerant is supplied to second water-refrigerant heat exchanger 12 or outside condenser 39. Compressor 38 sucks a low-pressure refrigerant via a junction pipe from first water-refrigerant heat exchanger 11 of constituent unit 10 or evaporator 48.

Engine cooling portion 40 includes a water jacket for supplying a coolant to an area around the engine, and a pump for supplying a coolant to the water jacket. Engine cooling portion 40 releases heat from the engine to the coolant flowing in the water jacket. The pump is rotated by power of the engine, for example. Engine cooling portion 40 may include a radiator which radiates heat to the outside air when an amount of exhaust heat from the engine increases. A coolant path of engine cooling portion 40 communicates with heater core 44.

The coolant is an antifreezing liquid, such as LLC (long Life Coolant), which functions as a liquid for transferring heat.

The structure for transferring a coolant may be constituted by the pump of engine cooling portion 40 alone. This structure reduces costs of the device and a space required for installation of the device. Additional pumps may be provided at other positions of the coolant pipe to improve coolant transfer capability.

Heater core 44 is a device which performs heat exchange between a coolant and air, and disposed in the intake air path of HVAC 70 provided to supply air to the vehicle interior. Heater core 44 receives a heated coolant, and releases the heat of the coolant to intake air to be supplied to the vehicle interior (air blowing to the vehicle interior) during heating operation. Heater core 44 can adjust an amount of passing air by varying an opening of door 44a. Door 44a can be electrically controlled to open and close. Door 44a is called a mix door as well.

Evaporator 48 is a device which performs heat exchange between a low-temperature and low-pressure refrigerant and air, and disposed in the intake air path of HVAC 70. Evaporator 48 receives a flow of a low-temperature and low-pressure refrigerant during cooling operation, dehumidifying operation, or temperature control operation, and cools the intake air to be supplied to the vehicle interior (air blowing to the vehicle interior).

Expansion valve 37 expands a high-pressure refrigerant into a low-temperature and low-pressure refrigerant, and discharges the expanded refrigerant to evaporator 48. Expansion valve 37 is disposed in the vicinity of evaporator 48. Expansion valve 37 may be a TXV (thermal expansion valve) which has a function of automatically adjusting a discharge amount of a refrigerant in accordance with a temperature of a refrigerant delivered from evaporator 48.

Outside condenser 39 includes a path for a flow of a refrigerant and a path for a flow of air. Outside condenser 39 is disposed in the vicinity of a head of the vehicle inside an engine room, for example, to perform heat exchange between a refrigerant and the outside air. Outside condenser 39 receives a flow of a high-temperature and high-pressure refrigerant in a cooling mode and a dehumidification mode, and discharges heat from the refrigerant to the outside air. Outside condenser 39 receives a blow of the outside air from a fan, for example. Reservoir tank 39a may be provided on a refrigerant delivery side of outside condenser 39.

Constituent unit 10 has an integrated structure manufactured as a single unit at a factory. Constituent unit 10 is connected with other components of vehicular air-conditioning device 1 via pipe during an assembly step of the vehicle. Respective constituent elements of constituent unit 10 may be contained within a single housing to be integrated with one another, or joined to one another to be integrated.

Constituent unit 10 includes first water-refrigerant heat exchanger 11, second water-refrigerant heat exchanger 12, first ON-OFF valve 13, second ON-OFF valve 14, and expansion valve 16 which is corresponding to a first expansion unit. Constituent unit 10 further includes coolant introduction pipe 18, coolant pipe 19, and coolant discharge pipe 20. One end of each of coolant introduction pipe 18 and coolant discharge pipe 20 is exposed to the outside of the housing of constituent unit 10 to connect with coolant pipe of the vehicular air-conditioning device. A connector or a socket for pipe connection may be provided at the one end of each of coolant introduction pipe 18 and coolant discharge pipe 20.

First water-refrigerant heat exchanger 11 (evaporator) includes a path for a flow of a low-temperature and low-pressure refrigerant, and a path for a flow of a coolant, and performs heat exchange between a refrigerant and a coolant. First water-refrigerant heat exchanger 11 receives a low-temperature and low-pressure refrigerant from expansion valve 16 in a predetermined operation mode, and transfers heat from a coolant to the low-temperature and low-pressure refrigerant. As a result, the low-temperature and low-pressure refrigerant is vaporized by first water-refrigerant heat exchanger 11.

A coolant introduction port of first water-refrigerant heat exchanger 11 communicates with heater core 44 via coolant introduction pipe 18, while a coolant delivery port of first water-refrigerant heat exchanger 11 communicates with second water-refrigerant heat exchanger 12 via coolant pipe 19. A refrigerant introduction port of first water-refrigerant heat exchanger 11 communicates with expansion valve 16 via pipe. A refrigerant delivery port of first water-refrigerant heat exchanger 11 communicates with pipe joined to an intake port of compressor 38.

Second water-refrigerant heat exchanger 12 (condenser) includes a path for a flow of a high-temperature and high-pressure refrigerant, and a path for a flow of a coolant, and performs heat exchange between a refrigerant and a coolant. Second water-refrigerant heat exchanger 12 receives a high-temperature and high-pressure refrigerant from compressor 38 in a predetermined operation mode, and releases heat from the high-temperature and high-pressure refrigerant to a coolant. As a result, the high-temperature and high-pressure refrigerant is condensed by second water-refrigerant heat exchanger 12.

A coolant introduction port of second water-refrigerant heat exchanger 12 communicates with first water-refrigerant heat exchanger via coolant pipe 19. A coolant delivery port of second water-refrigerant heat exchanger 12 communicates with engine cooling portion 40 via coolant introduction pipe 20. Coolant pipe 19 is included in constituent unit 10 together with first water-refrigerant heat exchanger 11 and second water-refrigerant heat exchanger 12, and integrated with constituent unit 10. A refrigerant introduction port of second water-refrigerant heat exchanger 12 communicates with a discharge port of compressor 38 via pipe, while a refrigerant delivery port of second water-refrigerant heat exchanger 12 communicates with expansion valve 16. Accordingly, the refrigerant path extending from second water-refrigerant heat exchanger 12 to first water-refrigerant heat exchanger 11, and the refrigerant path extending from outside condenser 39 to evaporator 48 are constituted by different refrigerant paths.

First ON-OFF valve 13 and second ON-OFF valve 14, each of which is a valve for switching opening and closing of refrigerant pipe under electric control, for example, may be constituted by solenoid valves, or the like. First ON-OFF valve 13 opens or closes the refrigerant path between a branch portion of the refrigerant path on a compressor 38 discharge side, and the refrigerant introduction port of outside condenser 39. Second ON-OFF valve 14 opens or closes the refrigerant path between the branch portion and the refrigerant introduction port of second water-refrigerant heat exchanger 12.

Expansion valve 16 expands a high-pressure refrigerant into a low-temperature and low-pressure refrigerant, and discharges the expanded refrigerant to first water-refrigerant heat exchanger 11. Expansion valve 16 may be constituted by a TXV (thermal expansion valve) which has a function of automatically adjusting a discharge amount of a refrigerant in accordance with a temperature of a refrigerant delivered from first water-refrigerant heat exchanger 11.

Check valve 15 is a valve provided between compressor 38 and evaporator 48 to prevent a backward flow of a refrigerant during an operation mode for generating no flow of a refrigerant at outside condenser 39 and evaporator 48. Consideration is now given to such an operation mode in which a refrigerant is supplied to a refrigerant circuit passing through first water-refrigerant heat exchanger 11 and second water-refrigerant heat exchanger 12 in a closing state of first ON-OFF valve 13. First ON-OFF valve 13 is closed in this operation mode, wherefore a refrigerant circuit passing through outside condenser 39 and evaporator 48 is cut off. In this case, however, refrigerant pressure at outside condenser 39 and evaporator 48 may decrease when the outside air temperature is low. This pressure drop may cause a backward flow of a refrigerant flowing in the refrigerant circuit of first water-refrigerant heat exchanger 11 and second water-refrigerant heat exchanger 12 toward the refrigerant circuit on an evaporator 48 side. As a result, an amount of a refrigerant in the refrigerant circuit passing through first water-refrigerant heat exchanger 11 and second water-refrigerant heat exchanger 12 deviates from an optimal range. Consequently, heat pump cycle efficiency may lower in such a condition. However, this problem is avoidable by providing check valve 15.

Figure 2:
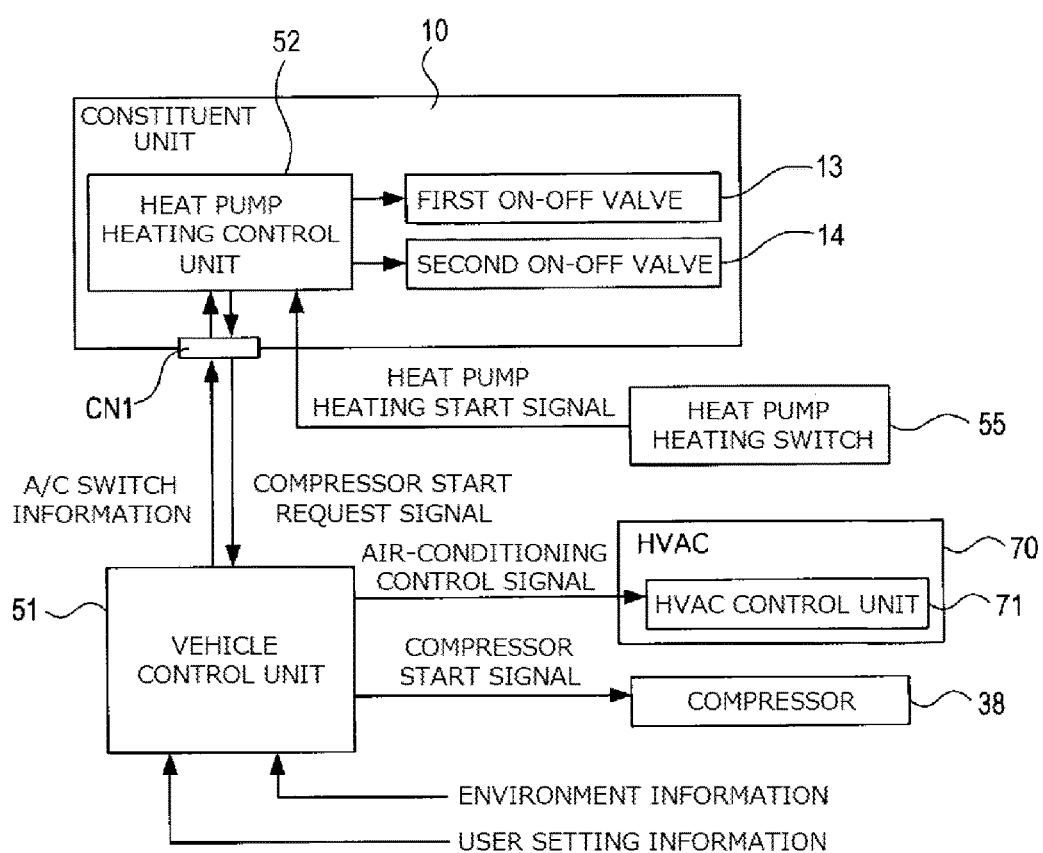
FIG. 2 is a block diagram illustrating a constitution controlling the vehicular air-conditioning device according to the first exemplary embodiment of the present disclosure.

FIG. 2 is a block diagram illustrating a constitution controlling the vehicular air-conditioning device according to the first exemplary embodiment of the present disclosure. Vehicular air-conditioning device 1 includes, as a control system, vehicle control unit 51 (corresponding to first control unit), HVAC control unit 71, heat pump heating control unit (corresponding to second control unit) 52, and heat pump heating switch 55.

Vehicle control unit 51 includes a microcomputer, an input/output interface (I/O), a program memory storing a control program, and a working memory, for example. The microcomputer of vehicle control unit 51 performs air-conditioning automatic control under the control program. User setting information and environment information are input to vehicle control unit 51.

The user setting information is air-conditioning information set by a user via an operation unit of an instrument panel, for example. The user setting information includes air-conditioning (A/C) switch information, set temperature information, set air flow information and the like for instructing operation of the heat pump chiefly for cooling or dehumidification.

The environment information is information obtained from various types of sensors provided on the vehicle or vehicular air-conditioning device 1. The environment information includes outside air temperature information, vehicle interior temperature information, information indicating discharge pressure from compressor 38, and information indicating opening of door 44a, for example.

Vehicle control unit 51 performs start control of compressor 38. When compressor 38 is of a type driven by engine power, start control of compressor 38 is executed by output of a compressor start signal for switching a clutch condition associated with engine power supply. When compressor 38 is of an electric power type, driving control of compressor 38 is executed by output of a compressor start signal for switching ON-OFF of driving power supply.

Vehicle control unit 51 further transmits instructions (signals for air-conditioning control such as door control) to HVAC control unit 71 to perform various types of control such as opening and closing of door 44a of heater core 44, opening and closing of respective doors of HVAC 70, and driving of fan F1. HVAC control unit 71 is configured to perform overall control of respective driving units of HVAC 70 based on instructions given from vehicle control unit 51.

Vehicle control unit 51 further includes a communication means capable of transmitting and receiving predetermined information to and from heat pump heating control unit 52. This communication means may be constituted by a serial bus or a CAN (Controller Area Network), or a communication means using a dedicated signal line, for example. When an existing communication means, such as CAN communication or serial bus communication, is used, only slight modification of a control program included in a conventional air-conditioning control unit is required to produce vehicle control unit 51. Alternatively, when a communication means constituted by a spare input/output port is used, only slight modification of a control program included in a conventional air-conditioning control unit is required to produce vehicle control unit 51.

Heat pump heating control unit 52 may be constituted by a microcomputer or a sequencer. Heat pump heating control unit 52 performs ON-OFF control of first ON-OFF valve 13 and second ON-OFF valve 14 chiefly for switching control of a heat pump heating mode.

Heat pump heating control unit 52 is housed in a control box formed integrally with constituent unit 10. This control box may be provided separately from a structure for a mechanical system of constituent unit 10.

Information for determining a necessity of the heat pump heating mode is input to heat pump heating control unit 52. More specifically, this information corresponds to switch information indicating ON-OFF of heat pump heating switch 55 (heat pump heating start signal). Heat pump heating switch 55 is an operation switch operable by a user. Heat pump heating control unit 52 determines that a shift to the heat pump heating mode is necessary based on input of the heat pump heating start signal generated in response to ON-operation of heat pump heating switch 55 performed by a user.

Heat pump heating control unit 52 may receive, as information for determining the necessity of the heat pump heating mode, the environment information such as outside air temperature information, vehicle interior temperature information, and coolant temperature information, and vehicle interior temperature setting information. Moreover, the information for determining the necessity of the heat pump heating mode may include state information of vehicular air conditioning device 1 such as information indicating opening of door 44a. Information to be input may include only part of these information, rather than all of the information. Heat pump heating control unit 52 detects a state that heat such as engine exhaust heat for heating is insufficient based on the information, and determines that a shift to the heat pump heating mode is necessary.

Heat pump heating control unit 52 includes a communication means capable of transmitting and receiving predetermined information to and from vehicle control unit 51. A communication line, which is not particularly limited, connects with heat pump heating control unit 52 via connector CN1 (corresponding to a connection portion).

Communication between heat pump heating control unit 52 and vehicle control unit 51 allows at least transmission of A/C switch information (corresponding to air-conditioning switch information) from the latter to the former, and a compressor start request signal from the former to the latter.

The A/C switch information is ON-OFF information about an A/C (Air Conditioner) switch provided on the operation unit of the instrument panel, for example. The A/C (Air Conditioner) switch is an operation switch operated by the user for instructing start of compressor 38 chiefly for cooling or dehumidification.

The compressor start request signal is a signal for requesting start of compressor 38. In response to this signal, heat pump heating control unit 52 allows start of compressor 38 even in an OFF-state of the A/C switch.

When the necessity of a shift to the heat pump heating mode is determined, heat pump heating control unit 52 determines whether or not compressor 38 is operating based on information received from vehicle control unit 51. When it is determined that compressor 38 is not operating, heat pump heating control unit 52 transmits the compressor start request signal to vehicle control unit 51. Vehicle control unit 51 drives compressor 38 in response to the compressor start request signal even in the OFF-state of the A/C switch. Heat pump heating control unit 52 further performs ON-OFF control of first ON-OFF valve 13 and second ON-OFF valve 14 to shift to the heat pump heating mode.

Information exchanged via communication between vehicle control unit 51 and heat pump heating control unit 52 may include information indicating the current operation mode of the vehicle air-conditioning device, and information indicating opening of the respective doors of HVAC 70, for example.

Operation of vehicular air-conditioning device 1 is hereinafter described. Vehicular air-conditioning device 1 operates in an operation mode switched among several modes including a hot water heating mode, the heat pump heating mode, a temperature control mode, and the cooling mode. The hot water heating mode is a mode for heating the vehicle interior without operating the heat pump. The heat pump heating mode is a mode for heating the vehicle interior by operating the heat pump. The cooling mode is a mode for cooling the vehicle interior by operation of the heat pump. The temperature control mode is a mode for controlling air temperature and humidity by an appropriate combination of air cooling and dehumidification utilizing a low-temperature refrigerant, and air heating utilizing a high-temperature coolant. Discussed hereinbelow are the heat pump heating mode and the cooling mode as representative exemplary modes.

[Heat Pump Heating Mode]

Figure 3:
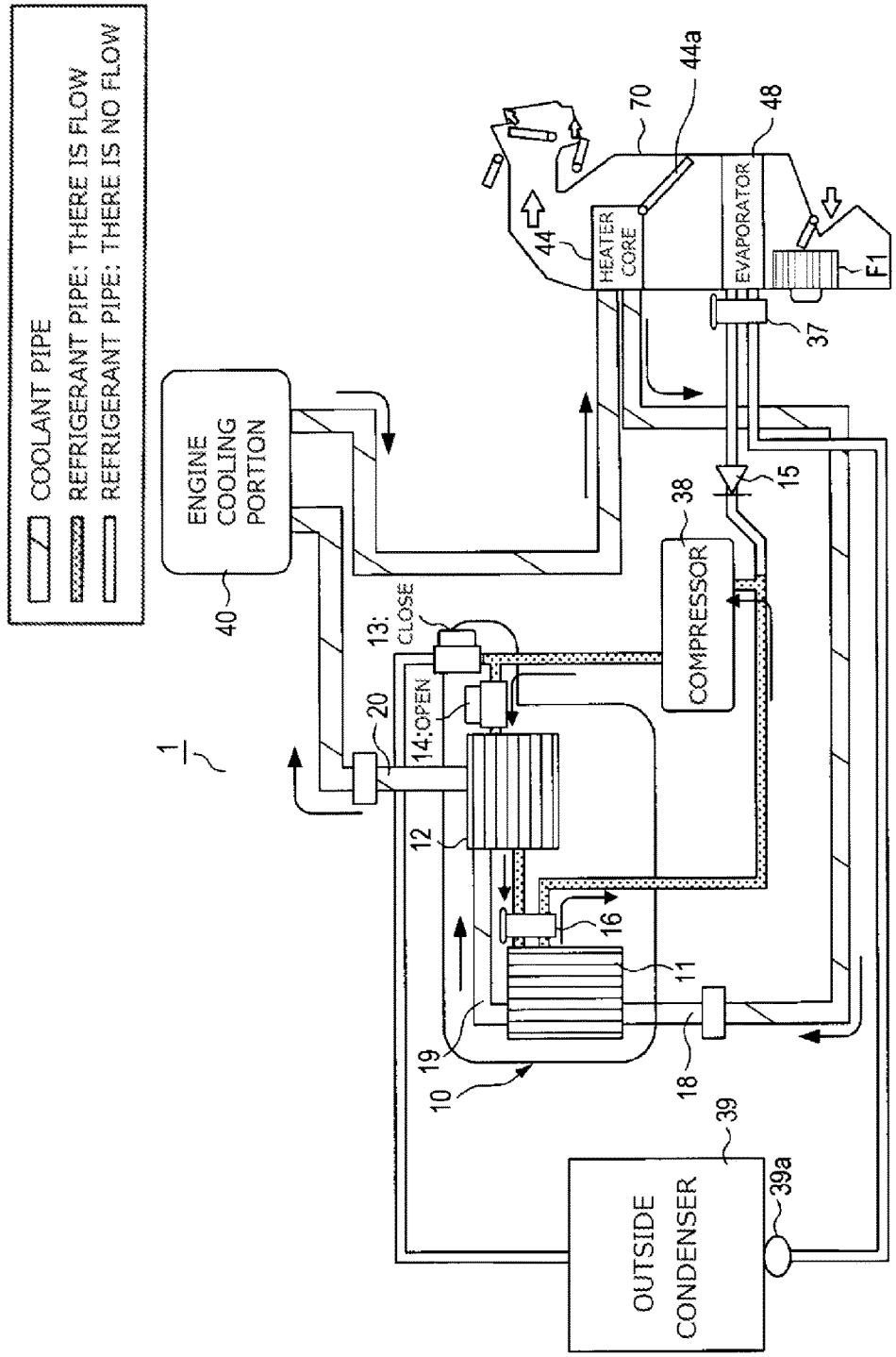
FIG. 3 is a diagram for describing operation in a heat pump heating mode of the vehicular air-conditioning device illustrated in FIG. 1.

FIG. 3 is a diagram for describing operation in the heat pump heating mode. As illustrated in FIG. 3, first ON-OFF valve 13 is closed, while second ON-OFF valve 14 is opened in the heat pump heating mode. Door 44a of heater core 44 is opened (full-open, for example).

Compressor 38 is further operated in the heat pump heating mode to allow a refrigerant to circulate through second water-refrigerant heat exchanger 12, expansion valve 16, first water-refrigerant heat exchanger 11, and compressor 38 in this order.

A high-temperature and high-pressure refrigerant compressed by compressor 38 condenses by releasing heat to a coolant at second water-refrigerant heat exchanger 12. The condensed refrigerant is expanded into a low-temperature and low-pressure refrigerant by expansion valve 16, and supplied to first water-refrigerant heat exchanger 11. The low-temperature and low-pressure refrigerant vaporizes by absorbing heat from a coolant at first water-refrigerant heat exchanger 11. The vaporized low-pressure refrigerant is sucked and compressed by compressor 38.

The coolant circulates through engine cooling portion 40, heater core 44, first water-refrigerant heat exchanger 11, and second water-refrigerant heat exchanger 12 in this order.

The coolant heated by second water-refrigerant heat exchanger 12 further absorbs heat from the engine at engine cooling portion 40, and flows toward heater core 44. The high-temperature coolant at heater core 44 is capable of sufficiently heating intake air to be supplied to the vehicle interior.

The coolant having passed through heater core 44 has a higher temperature than the temperature of the outside air, and is capable of releasing heat to the refrigerant at first water-refrigerant heat exchanger 11 to vaporize the refrigerant. The coolant cooled by first water-refrigerant heat exchanger 11 is heated by second water-refrigerant heat exchanger 12, supplied to engine cooling portion 40, and further heated by heat of the engine. This operation secures heating capability in the vehicle interior.

[Cooling Mode]

Figure 4:
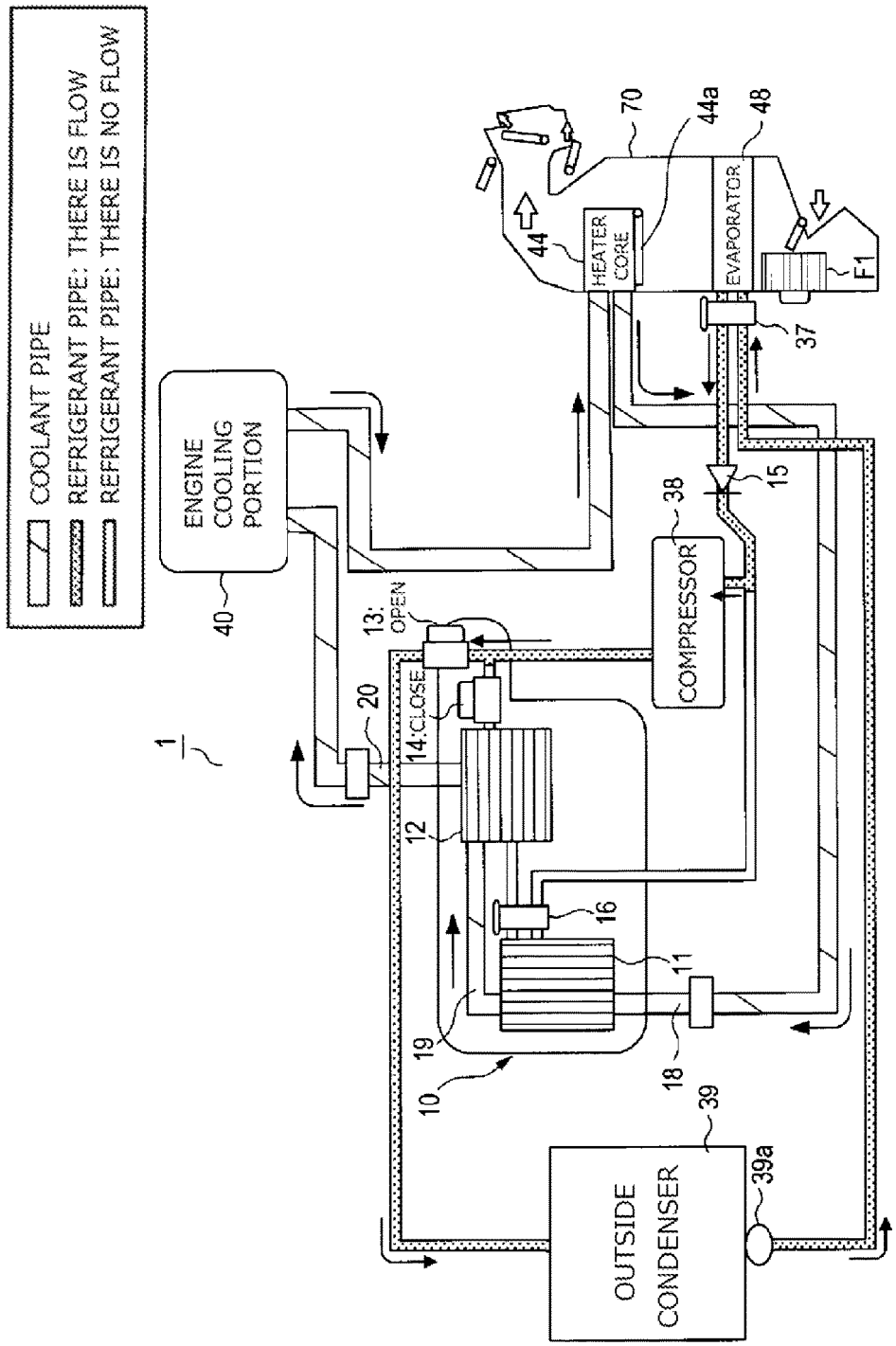
FIG. 4 is a diagram for describing operation in a cooling mode of the vehicular air-conditioning device illustrated in FIG. 1.

FIG. 4 is a diagram for describing operation in the cooling mode. During the cooling mode, first ON-OFF valve 13 is opened, while second ON-OFF valve 14 is closed as illustrated in FIG. 4. Door 44a of heater core 44 is fully closed.

Compressor 38 is further operated in the cooling mode to allow a refrigerant to circulate through outside condenser 39, expansion valve 37, evaporator 48, and compressor 38 in this order.

A high-temperature and high-pressure refrigerant compressed by compressor 38 condenses by releasing heat to the air at outside condenser 39.

The condensed refrigerant is expanded by expansion valve 37 into a low-temperature and low-pressure refrigerant, and supplied to evaporator 48. The low-temperature and low-pressure refrigerant vaporizes at evaporator 48 after cooling intake air to be supplied to the vehicle interior. The vaporized low-pressure refrigerant is sucked and compressed by compressor 38.

The coolant flows through engine cooling portion 40, first water-refrigerant heat exchanger 11, heater core 44, and second water-refrigerant heat exchanger 12. The coolant exchanges substantially no heat with the refrigerant or air while passing through heater core 44, first water-refrigerant heat exchanger 11, and second water-refrigerant heat exchanger 12. Heat release from the coolant is chiefly carried out via the radiator of engine cooling portion 40. The engine has an extremely high temperature, wherefore appropriate cooling is achievable based on heat release from the radiator even at a high temperature of the outside air. The structure for supplying a coolant may be designed to increase a flow of a coolant on a radiator side, and to decrease a flow of a coolant on a heater core 44 side. This operation realizes sufficient cooling in the vehicle interior.

As described above, vehicular air-conditioning device 1 according to this exemplary embodiment does not directly introduce a high-temperature coolant discharged from engine cooling portion 40 into second water-refrigerant heat exchanger 12, but introduces a coolant having passed through heater core 44 and first water-refrigerant heat exchanger 11 to have a reduced temperature into second water-refrigerant heat exchanger 12.

The coolant introduced into second water-refrigerant heat exchanger 12 after reduction of the coolant temperature is given a sufficient amount of heat at second water-refrigerant heat exchanger 12. As a result, vehicular air-conditioning device 1 according to this exemplary embodiment increases the temperature of the air to be supplied from heater core 44 to the vehicle interior during heating operation. This structure produces an advantageous effect of improvement of heating performance of vehicular air-conditioning device 1 according to this exemplary embodiment.

Moreover, vehicular air-conditioning device 1 according to this exemplary embodiment introduces a coolant heated by second water-refrigerant heat exchanger 12 to engine cooling portion 40. This structure achieves rapid heating of the engine within engine cooling portion 40, thereby improving engine efficiency.

Vehicular air-conditioning device 1 according to this exemplary embodiment provides coolant pipe 19 within constituent unit 10 as an integrated component. This structure of the exemplary embodiment is particularly advantageous in changing a conventional vehicular air-conditioning device mounted on a vehicle into a vehicular air-conditioning device including a minor change or option change from the conventional vehicular air-conditioning device to perform heating operation by utilizing a heat pump cycle.

When the coolant circulates through engine cooling portion 40, second water-refrigerant heat exchanger 12, heater core 44, and first water-refrigerant heat exchanger 11 in this order, for example, constituent unit 10 needs to have four connection portions for connecting with outside coolant pipe. These four connection portions are an introduction portion from engine cooling portion 40, a discharge portion to heater core 44, an introduction portion from heater core 44, and a discharge portion to engine cooling portion 40.

According to vehicular air-conditioning device 1 of this exemplary embodiment, however, first water-refrigerant heat exchanger 11 and second water-refrigerant heat exchanger 12 are connected with each other via coolant pipe 19 within constituent unit 10. Accordingly, the connection portions with coolant pipe can be reduced to two connection portions, i.e., coolant introduction pipe 18 and coolant discharge pipe 20. This structure produces an advantageous effect that vehicular air-conditioning device 1 of this exemplary embodiment can be easily mounted between constituent elements of the conventional vehicular air-conditioning device.

Furthermore, vehicular air-conditioning device 1 according to this exemplary embodiment has a basic structure constituted by both a structure of a hot water heater which supplies an engine coolant to heater core 44 for heating, and a structure of a heat pump cooling device which uses a low-temperature and low-pressure refrigerant of a heat pump for cooling. Constituent unit 10 is added to this basic structure to achieve heating in the vehicle interior by utilizing the heat pump. This structure realizes prompt heating in the vehicle interior with reduced energy by utilizing operation of the heat pump even at a low temperature of the engine.

In other words, vehicular air-conditioning device 1 according to this exemplary embodiment developed from the basic structure of the hot water heater and the heat pump cooling device adopted in a conventional vehicle realizes improvement of heating performance by utilizing a common compressor and a common refrigerant for both cooling operation and heating operation.

When no devisal is given in case of addition of the heat pump heating function to the basic structure of the vehicular air-conditioning device adopted in the conventional vehicle, reconstitution of the entire control system of the air-conditioning device may be required. According to vehicular air-conditioning device 1 of this exemplary embodiment, however, vehicle control unit 51 for controlling HVAC 70 and compressor 38, and heat pump heating control unit 52 for controlling operation units of constituent unit 10 (first ON-OFF valve 13 and second ON-OFF valve 14) are separately provided. In this condition, vehicle control unit 51 and heat pump heating control unit 52 are communicatively connected with each other. This structure allows switching of the operation mode of vehicular air-conditioning device 1 to the heat pump heating mode, and control of operation of the heat pump heating mode under additional control by heat pump heating control unit 52 of constituent unit 10, while utilizing the control system structure of the heat pump cooling device adopted in the conventional vehicle.

The description of the first exemplary embodiment of the present disclosure is now completed. Discussed according to this exemplary embodiment is an example of the structure which includes first ON-OFF valve 13 and second ON-OFF valve 14 as a switching unit for switching the flow of a refrigerant. However, the switching unit may be constituted by three-way valve 17 illustrated in FIG. 5.

Figure 5:
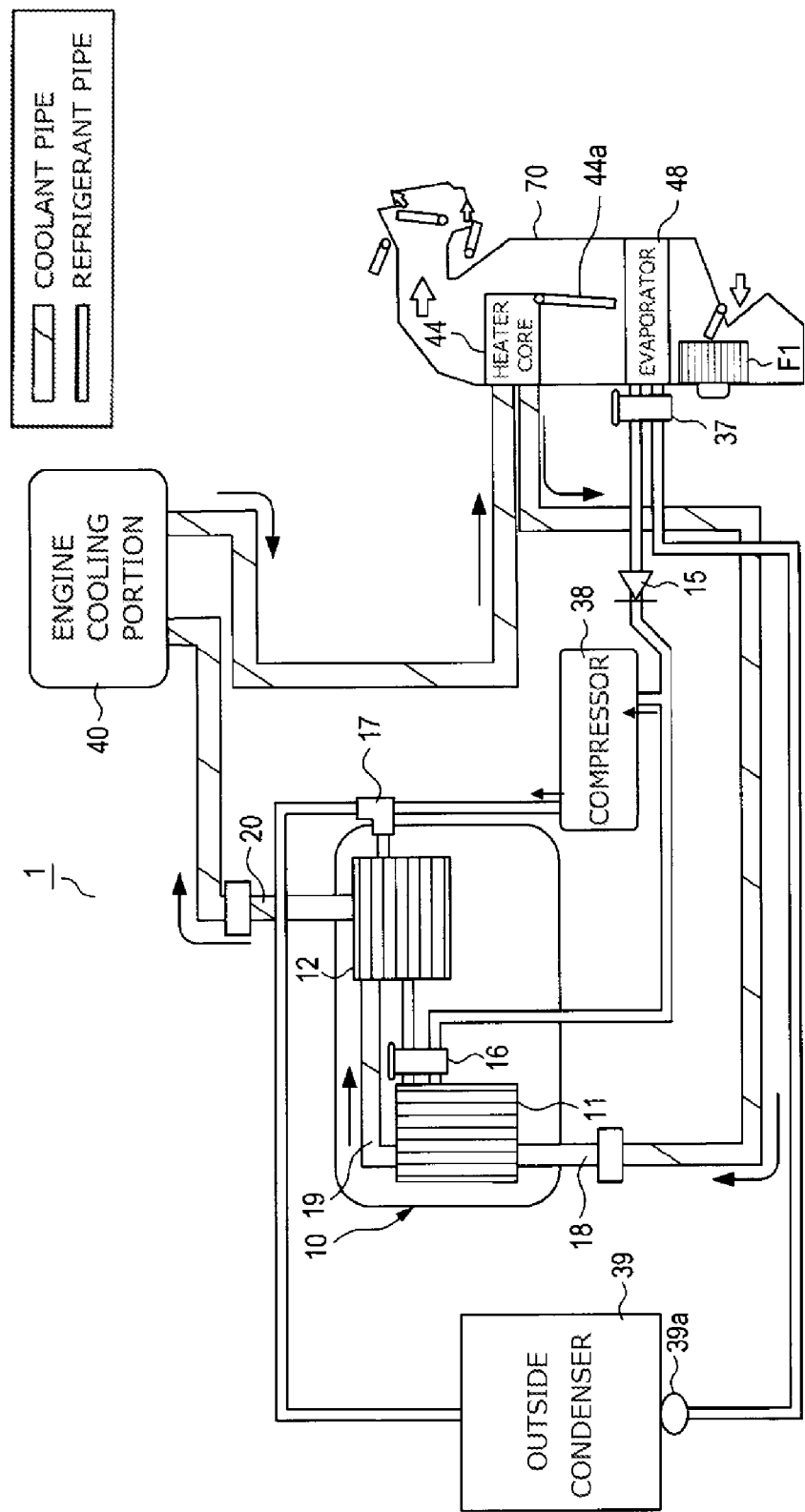
FIG. 5 is a configuration diagram illustrating a modified example of the vehicular air-conditioning device according to the first exemplary embodiment of the present disclosure.

FIG. 5 is a configuration diagram illustrating a modified example of the vehicular air-conditioning device according to the exemplary embodiment of the present disclosure.

Three-way valve 17 is disposed at a position where the refrigerant path from the discharge port of compressor 38 is branched into a refrigerant introduction side of second water-refrigerant heat exchanger 12, and a refrigerant introduction side of outside condenser 39. Three-way valve 17 is a valve capable of switching between one side and the other side of the flow of a refrigerant introduced from the discharge port of compressor 38 under electric control.

Three-way valve 17 may be included in constituent unit 10 and integrated with other constituent elements of constituent unit 10.

Discussed in this exemplary embodiment is an example of a structure in which first ON-OFF valve 13 and second ON-OFF valve 14 are positioned within constituent unit 10. However, one or both of first ON-OFF valve 13 and second ON-OFF valve 14 may be separately provided outside constituent unit 10.

Discussed in this exemplary embodiment is an example of a structure in which various types of signals and information are input to vehicle control unit 51 and heat pump heating control unit 52. However, these signals and information may be omitted or modified in appropriate manners without departing from the scope of the subject manners of the disclosure. For example, air-conditioning signals output from vehicle control unit 51 according to the description herein may be output from heat pump heating control unit 52 to HVAC control unit 71.

Discussed in this exemplary embodiment is an example of a structure in which vehicle control unit 51 and heat pump heating control unit 52 are provided as separate components, and vehicle control unit 51 and heat pump heating control unit 52 are communicatively connected with each other. However, the function of heat pump heating control unit 52 may be added to vehicle control unit 51 to eliminate heat pump heating control unit 52. More specifically, start control of compressor 38 and switch control of first ON-OFF valve 13 and second ON-OFF valve 14 may be performed by one control unit.

Second Exemplary Embodiment

Figure 6:
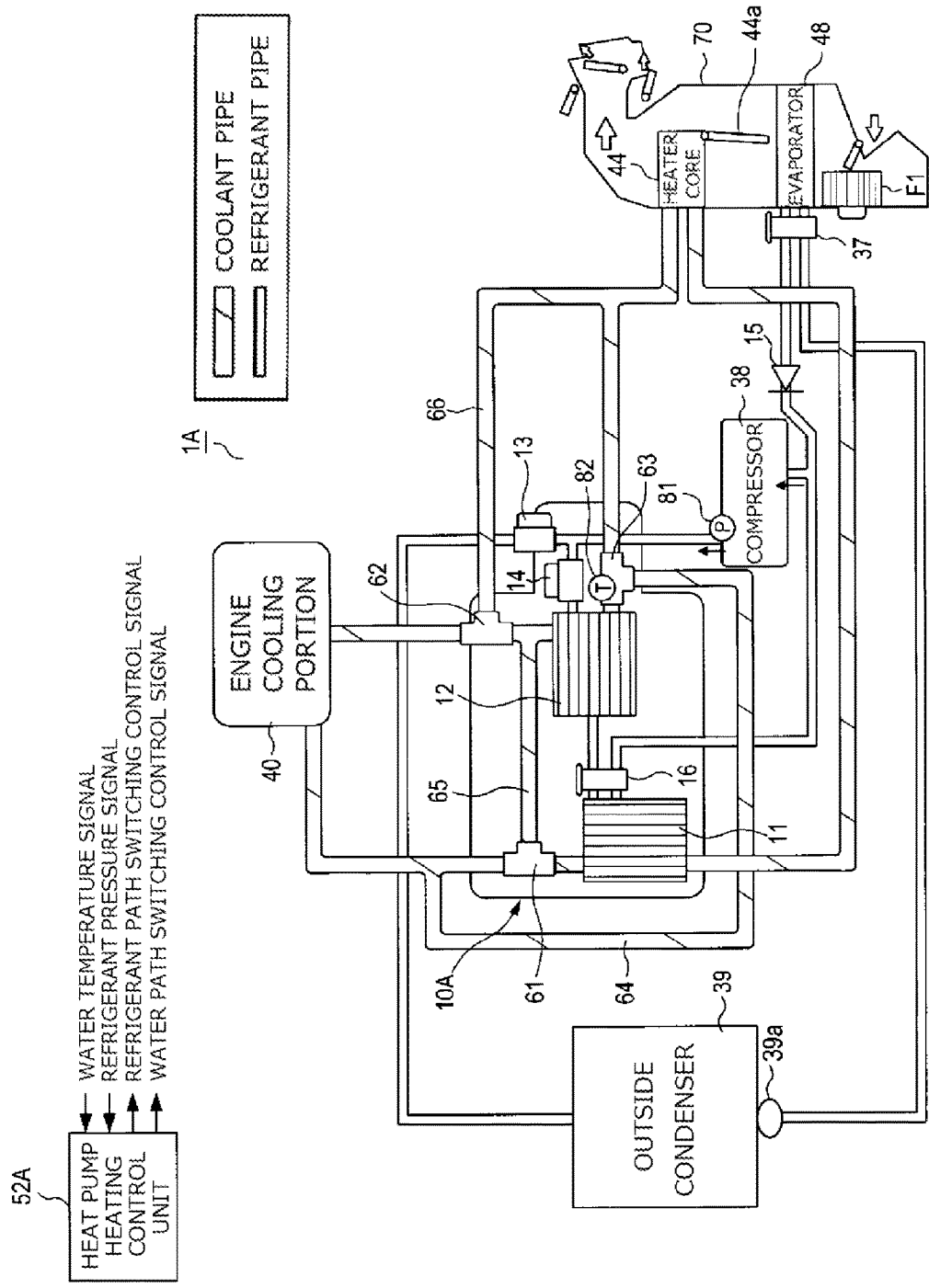
FIG. 6 is a configuration diagram illustrating a vehicular air-conditioning device according to a second exemplary embodiment of the present disclosure.

FIG. 6 is a configuration diagram illustrating a vehicular air-conditioning device according to a second exemplary embodiment of the present disclosure. Vehicular air-conditioning device 1A of the second exemplary embodiment partially includes constituent elements identical to the corresponding constituent elements of vehicular air-conditioning device 1 of the first exemplary embodiment. The identical constituent elements are given identical reference marks, and not repeatedly explained in detail.

Vehicular air-conditioning device 1A includes compressor 38, engine cooling portion 40, heater core 44, evaporator 48, expansion valve 37, outside condenser 39, and check valve 15. Vehicular air-conditioning device 1A further includes first water-refrigerant heat exchanger 11, second water-refrigerant heat exchanger 12, first ON-OFF valve 13, second ON-OFF valve 14, expansion valve 16, pressure sensor 81, and temperature sensor 82.

Vehicular air-conditioning device 1A further includes water path switching valves 61, 62, 63 (corresponding to water path switching unit), and branch pipe 64, 65, 66 for a coolant, both as a structure for switching a path of a coolant (hereinafter referred to as water circuit as well).

Each of water path switching valves 61, 62, 63 is constituted by a three-way valve, for example, which selectively switches between water paths in three directions for a coolant flow. Each of water path switching valves 61, 62, 63 switches the water path for the coolant flow under electric or mechanical control. Each of the three-way valves may be replaced with two ON-OFF valves.

Water path switching valve 61 is capable of selectively switching the water path such that a coolant can flow from first water-refrigerant heat exchanger 11 to engine cooling portion 40, or from first water-refrigerant heat exchanger 11 to second water-refrigerant heat exchanger 12. Water path switching valve 62 is capable of selectively switching the water path such that a coolant can flow from engine cooling portion 40 to second water-refrigerant heat exchanger 12, or from engine cooling portion 40 to heater core 44. Water path switching valve 63 is capable of selectively switching the water path such that a coolant can flow from second water-refrigerant heat exchanger 12 to engine cooling portion 40, or from second water-refrigerant heat exchanger 12 to heater core 44.

Pipe of a coolant is so provided as to allow the foregoing switching of the water path. For example, branch pipe 64 connects a coolant delivery side of second water-refrigerant heat exchanger 12 with a coolant introduction side of engine cooling portion 40. Branch pipe 65 connects a coolant delivery side of first water-refrigerant heat exchanger 11 with a coolant introduction side of second water-refrigerant heat exchanger 12. Branch pipe 66 connects a coolant delivery side of engine cooling portion 40 with a coolant introduction side of heater core 44.

Temperature sensor 82 detects a temperature of a coolant (referred to as water temperature as well), and outputs a water temperature signal indicating the water temperature. Temperature sensor 82 detects an outlet temperature of a coolant from second water-refrigerant heat exchanger 12, for example. Temperature sensor 82 may detect a temperature of a coolant at another position, such as an outlet temperature of engine cooling portion 40, as long as a temperature of a coolant flowing through second water-refrigerant heat exchanger 12 can be estimated based on this temperature.

Pressure sensor 81 detects a discharge pressure of a refrigerant at compressor 38, and outputs a refrigerant pressure signal indicating this pressure. Pressure sensor 81 may detect a pressure of a refrigerant at another position as long as a discharge pressure of a refrigerant can be estimated based on this pressure.

According to constituent unit 10A of the second exemplary embodiment, first water-refrigerant heat exchanger 11, second water-refrigerant heat exchanger 12, first ON-OFF valve 13, second ON-OFF valve 14, expansion valve 16, water path switching valves 61, 62, 63, branch pipe 65, and others of the foregoing structure are integrated with one another.

Constituent unit 10A is a component manufactured as a single unit at a factory. Pipe of constituent unit 10A is connected with pipe outside constituent unit 10A in an assembly step of the vehicle or vehicular air-conditioning device 1A. Pipe may be connected via a connector or a socket for pipe connection. Respective constituent elements of constituent unit 10A may be accommodated in a single housing to be integrated with one another, or joined to one another to be integrated.

Any or all of water path switching valves 61, 62, 63 may be disposed outside constituent unit 10A rather than included in constituent unit 10A. Branch pipe 65 may be disposed outside constituent unit 10A rather than included in constituent unit 10A. Branch pipe 64 may be included in constituent unit 10A rather than being disposed outside constituent unit 10A.

Heat pump heating control unit 52A performs water circuit switching control in addition to control performed by heat pump heating control unit 52 of the first exemplary embodiment. In other words, heat pump heating control unit 52A corresponds to a water path control unit in the second exemplary embodiment.

Heat pump heating control unit 52A receives the water temperature signal from temperature sensor 82, and the refrigerant pressure signal from pressure sensor 81 in addition to input signals similar to the corresponding signals of heat pump heating control unit 52 of the first exemplary embodiment.

Heat pump heating control unit 52A outputs water path switching control signals for switching of water circuits by water path switching valves 61, 62, 63 in addition to control signals similar to the corresponding signals output from heat pump heating control unit 52 of the first exemplary embodiment.

Discussed hereinbelow is coolant route switching control performed by heat pump heating control unit 52A. Heat pump heating control unit 52A is capable of switching the route of a coolant between a first switching state and a second switching state. The route in the first switching state is referred to as water circuit C1, while the route in the second switching state is referred to as water circuit C2.

[Water Circuit C1]

Figure 7:
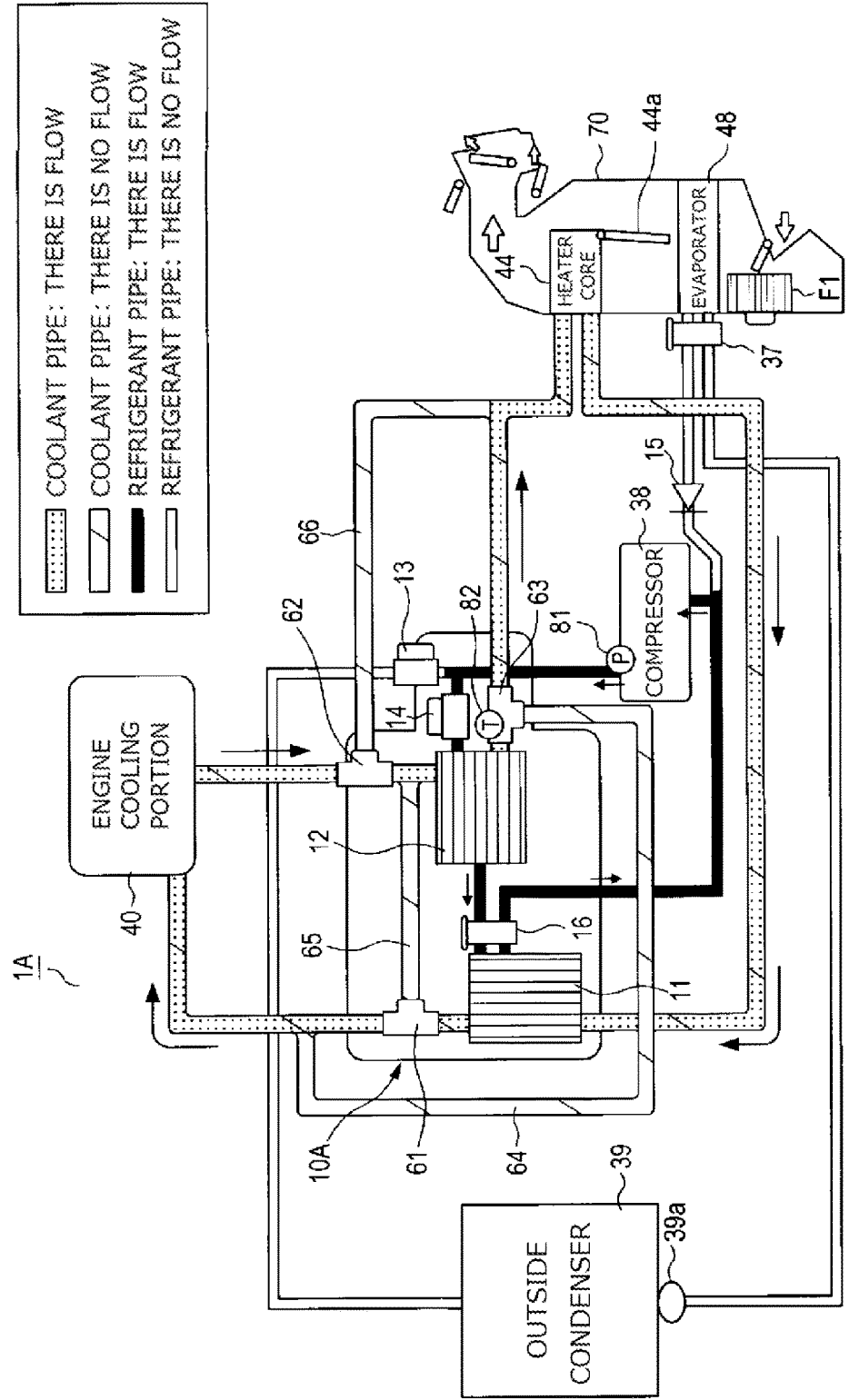
FIG. 7 is an explanatory diagram illustrating a first switching state of the vehicular air-conditioning device illustrated in FIG. 6.

FIG. 7 is an explanatory diagram illustrating the first switching state of the vehicular air-conditioning device according to the second exemplary embodiment.

In the first switching state, water circuit C1 is formed by switching of water path switching valves 61, 62, 63. In water circuit C1, a coolant circulates through engine cooling portion 40, second water-refrigerant heat exchanger 12, heater core 44, and first water-refrigerant heat exchanger 11 in this order.

In water circuit C1, a coolant delivered from engine cooling portion 40 can be heated by second water-refrigerant heat exchanger 12 when the coolant has a low temperature. The heated high-temperature coolant can be supplied to heater core 44.

[Water Circuit C2]

Figure 8:
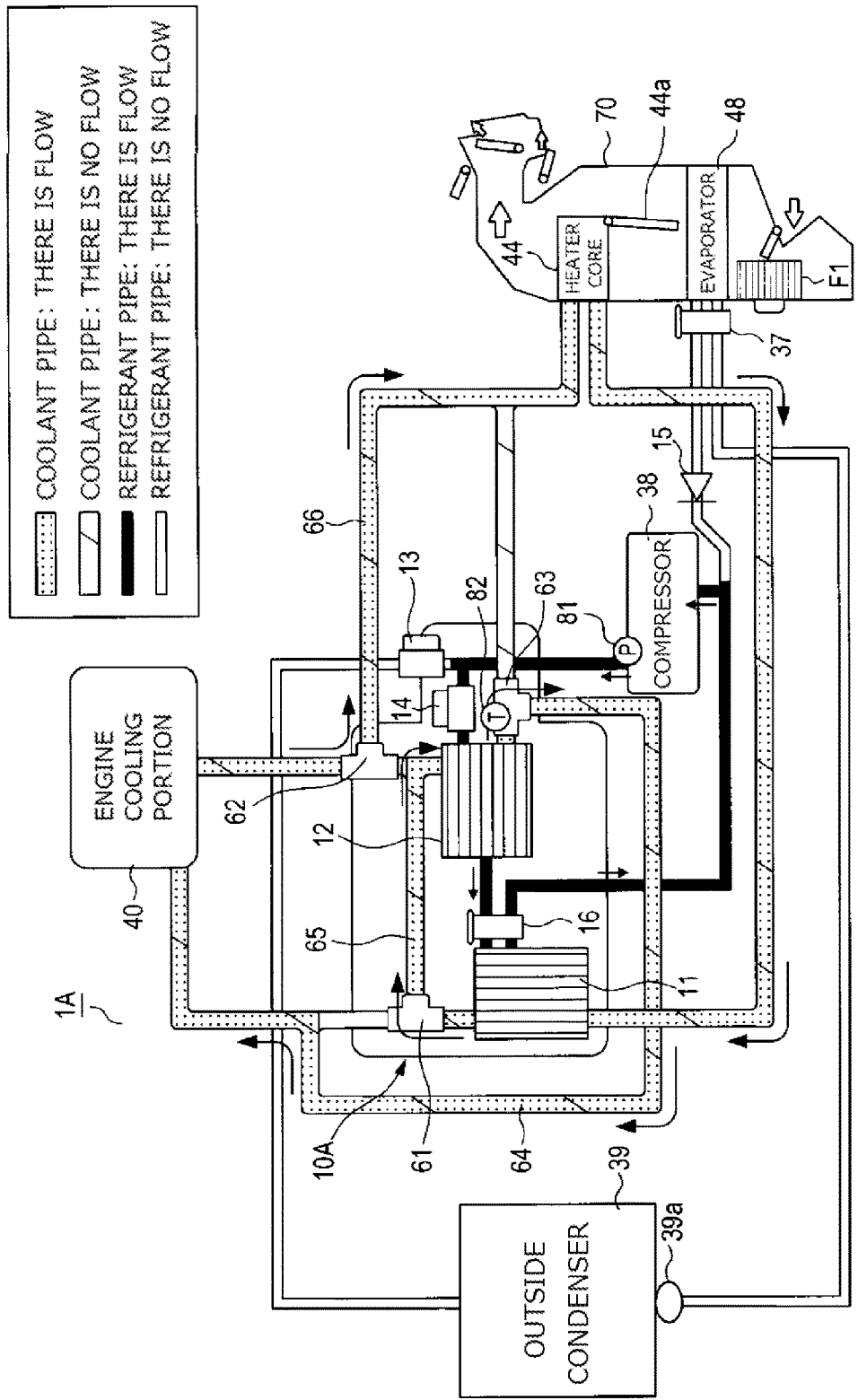
FIG. 8 is an explanatory diagram illustrating a second switching state of the vehicular air-conditioning device illustrated in FIG. 6.

FIG. 8 is an explanatory diagram illustrating the second switching state of the vehicular air-conditioning device according to the second exemplary embodiment.

In the second switching state, water circuit C2 is formed by switching of water path switching valves 61, 62, 63. In water circuit C2, a coolant circulates through engine cooling portion 40, heater core 44, first water-refrigerant heat exchanger 11, and second water-refrigerant heat exchanger 12 in this order.

In water circuit C2, a coolant delivered from engine cooling portion 40 can be supplied to heater core 44 and first water-refrigerant heat exchanger 11 for reduction of the temperature of the coolant, and then supplied to second water-refrigerant heat exchanger 12 when the coolant has a high temperature. This structure achieves condensation of a refrigerant at second water-refrigerant heat exchanger 12 at a low temperature even when the coolant delivered from engine cooling portion 40 has an extremely high temperature. In this case, a temperature level of a refrigerant in the heat pump cycle becomes lower than an upper limit. Accordingly, the discharge pressure of compressor 38 becomes lower than an upper limit, wherefore high heating performance is maintained based on continuous operation of compressor 38.

[Water Path Switching Control during Heat Pump Heating Mode]

Figure 9:
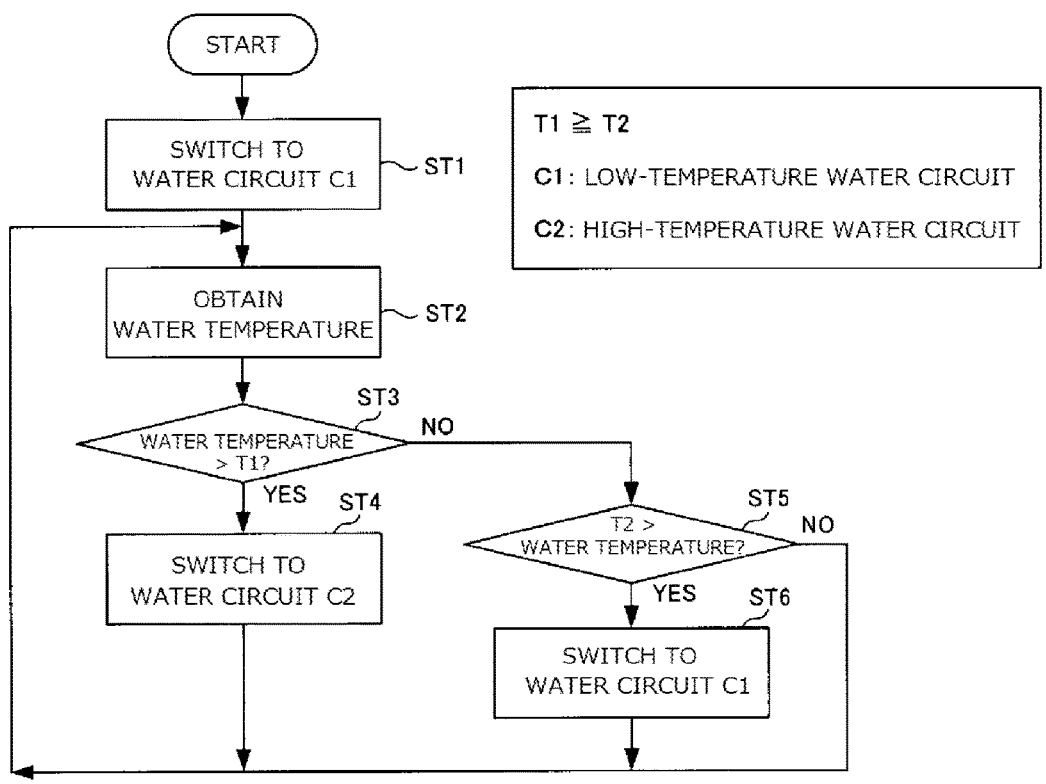
FIG. 9 is a flowchart for describing operation of a heat pump heating control unit of the vehicular air-conditioning device according to the second exemplary embodiment of the present disclosure.

FIG. 9 is a flowchart showing operation of the heat pump heating control unit according to the second exemplary embodiment.

Heat pump heating control unit 52A executes control shown in FIG. 9 (START in FIG. 9) in the heat pump heating mode.

With start of the heat pump heating mode, heat pump heating control unit 52A initially switches the route of a coolant to water circuit C1 illustrated in FIG. 7 by controlling water path switching valves 61, 62, 63 (step ST1). When water circuit C1 is already set, no action is carried out in this step.

Subsequently, heat pump heating control unit 52A repeats a loop process from step ST2 to step ST6.

In step ST2, heat pump heating control unit 52A receives output from temperature sensor 82 to obtain water temperature information.

In steps ST3 and ST5, heat pump heating control unit 52A determines whether the water temperature is higher than threshold T1, or lower than threshold T2.

Threshold T1 is a value equal to or higher than threshold T2. Threshold T1 is set to such a temperature at which an amount of heat given from a refrigerant to a coolant becomes small due to a high temperature of the coolant at second water-refrigerant heat exchanger 12. Threshold T2 is set to such a temperature at which an amount of heat given from heater core 44 to air to be supplied to the vehicle interior becomes small due to a low temperature of the coolant at second water-refrigerant heat exchanger 12.

When it is determined based on a result of the foregoing comparison that the water temperature is higher than threshold T1, heat pump heating control unit 52A switches the route of a coolant to water circuit C2 illustrated in FIG. 8 by controlling water path switching valves 61, 62, 63 (step ST4). When water circuit C2 is already set, no action is carried out in this step.

When the water temperature is lower than threshold T2, heat pump heating control unit 52A switches the route of a coolant to water circuit C1 illustrated in FIG. 7 by controlling water path switching valves 61, 62, 63 (step ST6). When water circuit C1 is already set, no action is carried out in this step.

When the water temperature lies between threshold T1 and threshold T2, the result is determined to be "NO" in steps ST3 and ST5. In this case, the loop process is continued without changing the current water circuit.

Threshold T1 and threshold T2 may be set to an identical value. Even in this state, heat pump heating control unit 52A is capable of switching between low-temperature water circuit C1 and high-temperature water circuit C2 by a process similar to the process illustrated in FIG. 9. In this case, heat pump heating control unit 52A switches the route of a coolant to water circuit C2 illustrated in FIG. 8 by controlling water path switching valves 61, 62, 63 (step ST4) when the water temperature is higher than threshold T1 (=threshold T2) corresponding to a predetermined temperature threshold (YES in step ST3).

When the water temperature is lower than threshold T2 (=threshold T1) (YES in step ST5), heat pump heating control unit 52A switches the route of a coolant to water circuit C1 illustrated in FIG. 7 by controlling water path switching valves 61, 62, 63 (step ST6). When the water temperature is equivalent to threshold T1 (=threshold T2), heat pump heating control unit 52A maintains water circuit C1 when water circuit C1 is already set, or maintains water circuit C2 when water circuit C2 is already set.

Under this control, the route of a coolant is switched to water circuit C1 to continue heat pump operation in the high water temperature state when the temperature of a coolant at second water-refrigerant heat exchanger 12 decreases. On the other hand, the route of a coolant is switched to water circuit C2 to continue heat pump operation without an excessive rise of the water temperature when the temperature of a coolant at second water-refrigerant heat exchanger 12 increases. This switching allows continuation of heat pump operation and achieves high heating performance regardless of the temperature of a coolant delivered from engine cooling portion 40.

[Modified Example of Water Path Switching Control]

Figure 10:
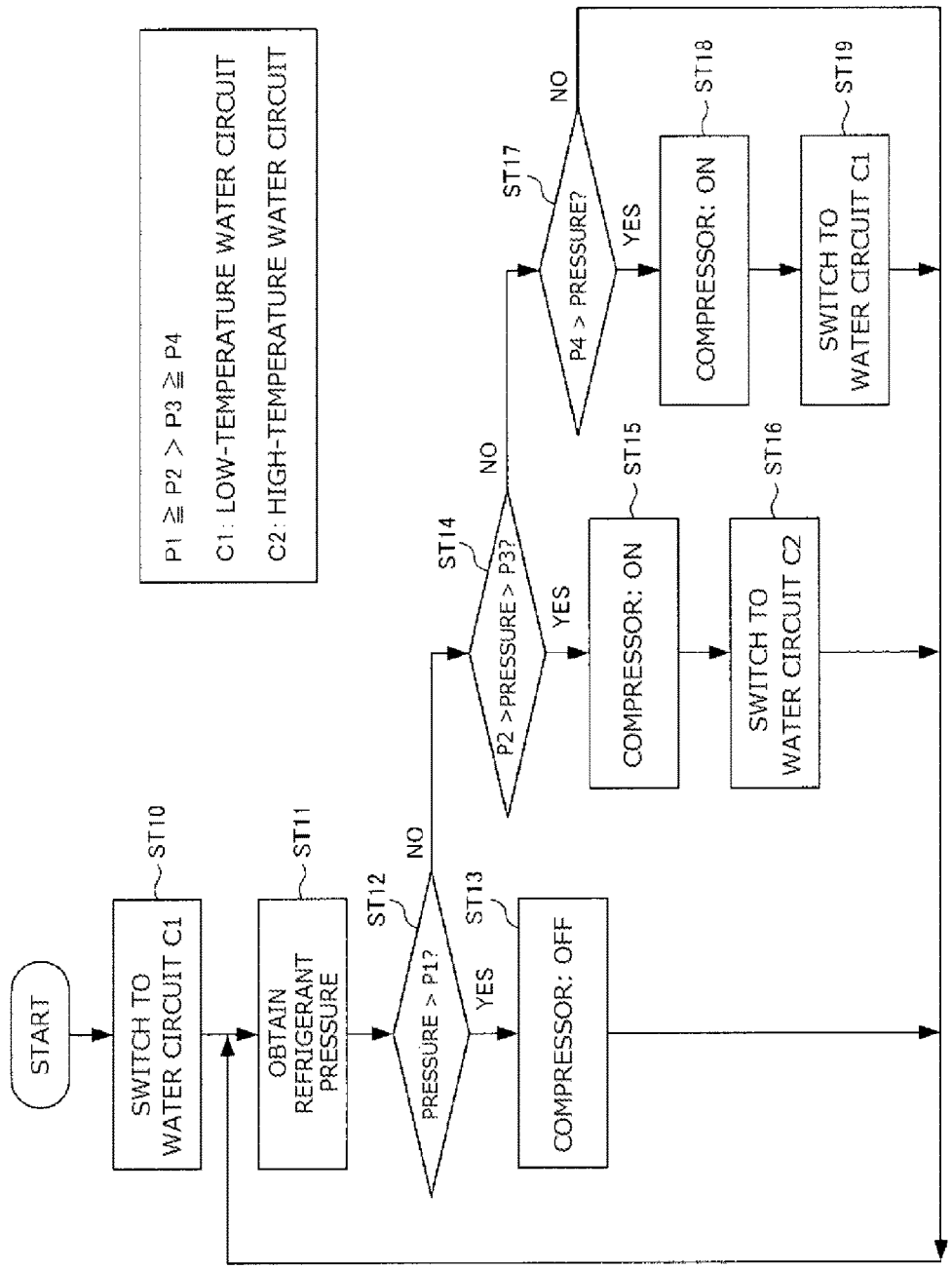
FIG. 10 is a flowchart for describing a modified example of operation of the heat pump heating control unit of the vehicular air-conditioning device according to the second exemplary embodiment of the present disclosure.

FIG. 10 is a flowchart showing a modified example of operation performed by the heat pump heating control unit according to the second exemplary embodiment.

Heat pump heating control unit 52A may perform control illustrated in FIG. 10 during the heat pump heating mode.

According to this control, heat pump heating control unit 52A initially switches the route of a coolant to water circuit C1 illustrated in FIG. 7 by controlling water path switching valves 61, 62, 63 (step ST10). When water circuit C1 is already set, no action is carried out in this step.

Subsequently, heat pump heating control unit 52A repeats a loop process from step ST11 to step ST19.

In step ST11, heat pump heating control unit 52A receives output from pressure sensor 81 to obtain refrigerant pressure information (such as discharge pressure from compressor 38).

In steps ST12, ST14, and ST17, it is determined whether the refrigerant pressure is higher than threshold P1, lies between threshold P2 and threshold P3, or is lower than threshold P4.

Thresholds P1, P2, P3, and P4 are set to values gradually decreasing in this order. Threshold P1 and threshold P2 may be set to an identical value. Threshold P3 and threshold P4 may be set to an identical value. In other words, any values may be set as long as a relation of threshold P1 threshold P2>threshold P3≥threshold P4 holds.

Threshold P1 is set to a value close to an upper limit of a refrigerant pressure, the value being a value at which compressor 38 is stopped. Threshold P2 is set to such a value at which stopped compressor 38 can be re-driven. Threshold P3 is set to such a value at which the pressure level of a refrigerant in the heat pump cycle is high with a small amount of heat given from a refrigerant to a coolant at second water-refrigerant heat exchanger 12. Threshold P4 is set to such a value at which the pressure level of a refrigerant in the heat pump cycle is low with a refrigerant excessively cooled by a coolant at second water-refrigerant heat exchanger 12.

When it is determined based on a result of comparison that the refrigerant pressure is higher than threshold P1, heat pump heating control unit 52A outputs an instruction for stopping compressor 38 (step ST13). No action is carried out in this step when compressor 38 is already stopped.

When the refrigerant pressure lies between threshold P1 and threshold P2, the result is determined to be "NO" in steps ST12, ST14, and ST17. In this case, the loop process is continued without changing the current state.

When the refrigerant pressure lies between threshold P2 and threshold P3, heat pump heating control unit 52A outputs an instruction for driving compressor 38 (step ST15). No action is carried out in this step when compressor 38 is already operating. Heat pump heating control unit 52A further switches the route of a coolant to water circuit C2 illustrated in FIG. 8 by controlling water path switching valves 61, 62, 63 (step ST16). When water circuit C2 is already set, no action is carried out in this step.

When the refrigerant pressure lies between threshold P3 and threshold P4, the result is determined to be "NO" in steps ST12, ST14, and ST17. In this case, the loop process is continued without changing the current state.

When the refrigerant pressure is lower than threshold P4, heat pump heating control unit 52A outputs an instruction for driving compressor 38 (ST18). No action is carried out in this step when compressor 38 is already operating. Heat pump heating control unit 52A further switches the route of a coolant to water circuit C1 illustrated in FIG. 7 by controlling water path switching valves 61, 62, 63 (step ST19). When water circuit C1 is already set, no action is carried out in this step.

Even in the state that threshold P1 and threshold P2 are set to an identical value, or that threshold P3 and threshold P4 are set to an identical value, heat pump heating control unit 52A can switch between low-temperature water circuit C1 and high-temperature water circuit C2 by a process similar to the process shown in FIG. 10. In this case, heat pump heating control unit 52A outputs an instruction for stopping compressor 38 (step ST13) when the refrigerant pressure is higher than threshold P1 (=threshold P2) (YES in step ST12).

Heat pump heating control unit 52A outputs an instruction for driving compressor 38 (step ST15) when the refrigerant pressure is lower than threshold P2 (=threshold P1) and higher than threshold P3 (=threshold P4) corresponding to a predetermined pressure threshold (YES in step ST14). Then, heat pump heating control unit 52A switches the route of a coolant to water circuit C2 illustrated in FIG. 8 (step ST16).

Heat pump heating control unit 52A outputs an instruction for driving compressor 38 (step ST18) when the refrigerant pressure is lower than threshold P4 (=threshold P3) (YES in step ST17). Then, heat pump heating control unit 52A switches the route of a coolant to water circuit C1 illustrated in FIG. 7 by controlling water path switching valves 61, 62, 63 (step ST19). When the refrigerant pressure is equivalent to threshold P4 (=threshold P3), heat pump heating control unit 52A maintains water circuit C1 when water circuit C1 is already set, and maintains water circuit C2 when water circuit C2 is already set.

Under this control, compressor 38 stops when the refrigerant pressure of the heat pump cycle approaches the upper limit in a state of an extremely high temperature of a coolant delivered from engine cooling portion 40. When the refrigerant pressure of the heat pump cycle becomes a high pressure in a state of a high temperature of the coolant delivered from engine cooling portion 40, water circuit C2 is selected to reduce the refrigerant pressure and continue the heat pump operation. When the refrigerant pressure of the heat pump cycle becomes a low pressure in a state of a low temperature of the coolant delivered from engine cooling portion 40, water circuit C1 is selected to increase the refrigerant pressure and continue the heat pump operation. This switching allows continuation of heat pump operation and achieves high heating performance regardless of the temperature of a coolant delivered from engine cooling portion 40.

[Modified Example of Water Circuit at High Temperature]

Figure 11A:
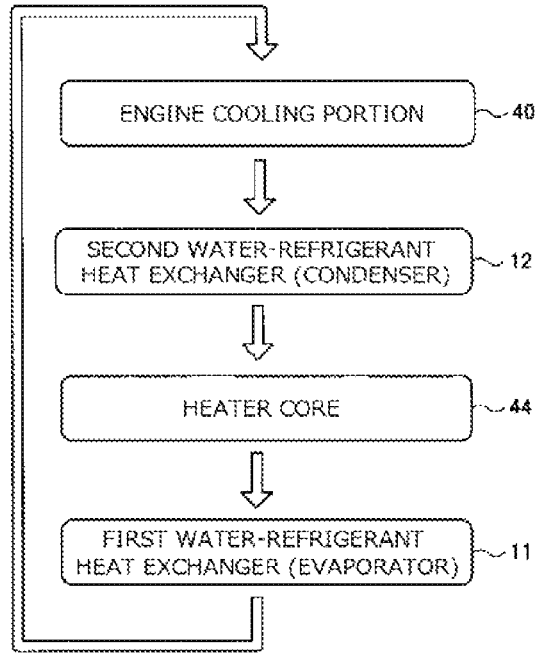
FIG. 11A is a block diagram for describing a modified example of a route of a low-temperature coolant of the vehicular air-conditioning device according to the second exemplary embodiment of the present disclosure.
Figure 11B:
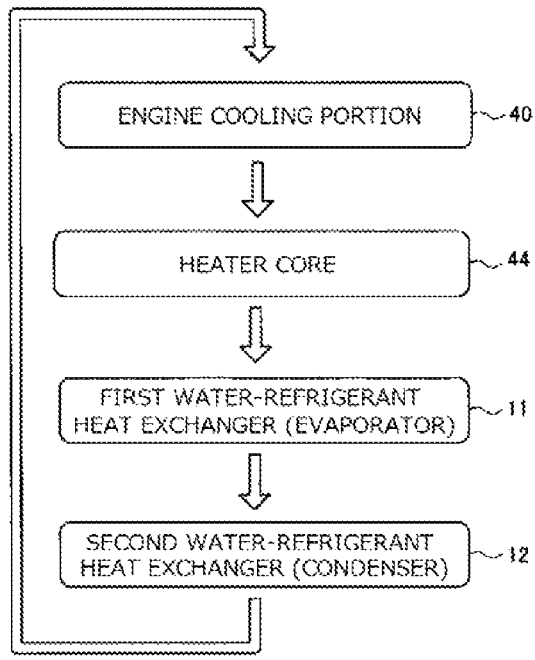
FIG. 11B is a block diagram for describing a modified example of a route of a high-temperature coolant of the vehicular air-conditioning device according to the second exemplary embodiment of the present disclosure.
Figure 11C:
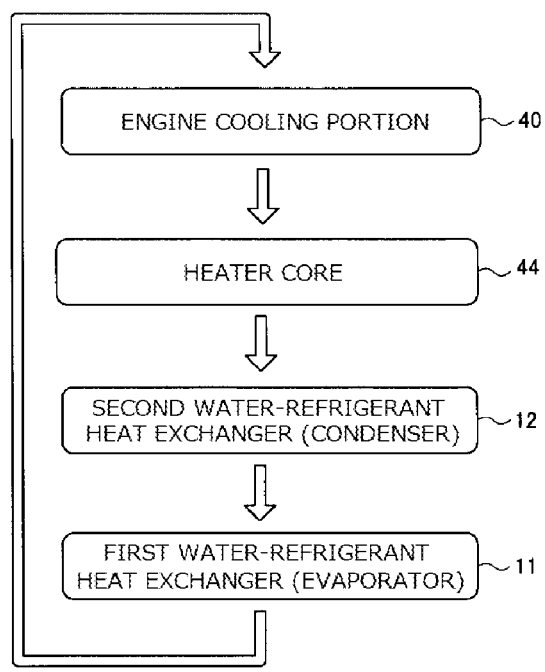
FIG. 11C is a block diagram for describing a modified example of a route of the high-temperature coolant of the vehicular air-conditioning device according to the second exemplary embodiment of the present disclosure.

FIGS. 11A through 11C are block diagrams for describing modified examples of routes of a coolant of the vehicular air-conditioning device according to the second exemplary embodiment. FIG. 11A shows water circuit C1 illustrated in FIG. 7 in the first switching state. FIG. 11B shows water circuit C2 illustrated in FIG. 8 in the second switching state. FIG. 11C shows water circuit C2a corresponding to a route of a high-temperature coolant according to a modified example of the second switching state.

According to the example illustrated in FIGS. 7 through 10, water circuit C1 shown in FIG. 11A is adopted as the route of a low-temperature coolant, and water circuit C2 shown in FIG. 11B is adopted as the route of a high-temperature coolant.

However, water circuit C2a shown in FIG. 11C may be used as the route of a high-temperature coolant. Water circuit C2a is a circuit in which a coolant flows through engine cooling portion 40, heater core 44, second water-refrigerant heat exchanger 12, and first water-refrigerant heat exchanger 11 in this order.

Water circuit C2a can be easily realized by addition and positional change of pipe for a coolant, and addition and positional change of a switching unit such as water path switching valves for switching a plurality of routes. Even in case of water circuit C2a, a coolant after coolant temperature reduction by heater core 44 can be supplied toward second water-refrigerant heat exchanger 12 when the temperature of the coolant delivered from engine cooling portion 40 is high. In this case, the heat pump operation can be continued while the pressure level of the refrigerant of the heat pump cycle is adjusted not to become excessively high even at a high temperature of a coolant. Accordingly, excellent heating capability is achievable.

Description of the second exemplary embodiment of the present disclosure is now completed. While an example of specific coolant pipe and water path switching valves for realizing water circuit C1 and water circuit C2 has been described in the second exemplary embodiment, the structure of the pipe and the water path switching unit for realizing switching among water circuits C1 through C3 may be modified in various ways. For example, while the water path is switched by using the water path switching valves according to the example, the valves may be constituted by three-way valves, four-way valves, or a combination of ON-OFF valves. Alternatively, the water path may be switched by changing the route of pipe for a flow of a coolant based on ON-OFF of water pumps disposed at respective portions of pipe for a coolant.

While the water circuits are switched based on the condition of the outlet water temperature of second water-refrigerant heat exchanger 12, or the condition of the discharge pressure of compressor 38, the detection position of the water temperature and the detection position of the refrigerant pressure may be other positions. The threshold of the water temperature or the threshold of the refrigerant pressure for switching the water circuit may be arbitrarily determined based on experiments, for example.

The condition for switching the water circuit may be an elapsed time from engine start, or an elapsed time from start of heating operation.

The modified examples for the refrigerant circuit and the control circuit structure of the first exemplary embodiment are applicable to the corresponding configurations of the second exemplary embodiment.

According to the first exemplary embodiment and the second exemplary embodiment, the refrigerant circuit for circulation of a refrigerant is switched between the first refrigerant circuit and the second refrigerant circuit. In the first refrigerant circuit, a refrigerant circulates through compressor 38, second water-refrigerant heat exchanger 12, and first water-refrigerant heat exchanger 11, and returns to compressor 38. In the second refrigerant circuit, a refrigerant circulates through compressor 38, outside condenser 39, and evaporator 48, and returns to compressor 38. However, in the second refrigerant circuit, a refrigerant may circulate through compressor 38, second water-refrigerant heat exchanger 12, outside condenser 39, and evaporator 48, and return to compressor 38.

According to the first exemplary embodiment and the second exemplary embodiment, the engine corresponds to a heating component of the vehicle by way of example. However, the heating component of the vehicle may be an electric motor used for running of an electric vehicle, a secondary battery for supplying running power, or various other types of heating components.

The present disclosure is applicable to a vehicular air-conditioning device mounted on an engine vehicle, an electric vehicle, an HEV (Hybrid Electric Vehicle), or various other types of vehicles.

The invention claimed is:

1. A vehicular air-conditioning device mounted on a vehicle that includes a heater core for heating air to be supplied to a vehicle interior, a heat generating component, and a cooling path for cooling the heat generating component, the vehicular air-conditioning device comprising:
   a first water-refrigerant heat exchanger that exchanges heat between a refrigerant of low-temperature and low-pressure and a coolant to vaporize the refrigerant; and
   a second water-refrigerant heat exchanger that exchanges heat between the coolant and the refrigerant of high-temperature and high-pressure discharged from a compressor for compressing the refrigerant to condense the refrigerant, wherein the coolant circulates through one of the first water-refrigerant heat exchanger and the second water-refrigerant heat exchanger, the other of the first water-refrigerant heat exchanger and the second water-refrigerant heat exchanger, the cooling path for cooling the heat generating component, and the heater core in this order, further comprising:
   the compressor that compresses the refrigerant;
   an evaporator that exchanges heat between the refrigerant of low-temperature and low-pressure and intake air to be supplied to the vehicle interior;
   a condenser that releases heat from the refrigerant of high-temperature and high-pressure to condense the refrigerant; and
   a switching unit capable of switching between a state where the refrigerant flows in a refrigerant circuit including the second water-refrigerant heat exchanger, the compressor, and the first water-refrigerant heat exchanger, and a state where the refrigerant flows in a refrigerant circuit including the evaporator, the compressor, and the condenser, wherein
   a refrigerant path extending from the second water-refrigerant heat exchanger to the first water-refrigerant heat exchanger is different from a refrigerant path extending from the condenser to the evaporator,
   a branch portion where a refrigerant path from a discharge port of the compressor is branched into a refrigerant introduction side of the condenser and a refrigerant introduction side of the second water-refrigerant heat exchanger, wherein
   the switching unit includes a first ON-OFF valve capable of cutting off a refrigerant path between the branch portion and the second water-refrigerant heat exchanger, and a second ON-OFF valve capable of cutting off a refrigerant path between the branch portion and the condenser.

2. The vehicular air-conditioning device according to claim 1, wherein
the first water-refrigerant heat exchanger introduces, via the heater core, the coolant discharged from the cooling path for cooling the heat generating component, and delivers the coolant toward the second water-refrigerant heat exchanger, and
the second water-refrigerant heat exchanger introduces the coolant from the first water-refrigerant heat exchanger, and delivers the coolant toward the cooling path for cooling the heat generating component.

3. The vehicular air-conditioning device according to claim 1, further comprising:
a first expansion unit that expands the refrigerant delivered from the second water-refrigerant heat exchanger and supplies the expanded refrigerant to the first water-refrigerant heat exchanger; and
a second expansion unit that expands the refrigerant condensed by the condenser and discharges the expanded refrigerant to the evaporator.

4. The vehicular air-conditioning device according to claim 1, further comprising:
the compressor that compresses the refrigerant;
an evaporator that exchanges heat between the refrigerant of low-temperature and low-pressure and intake air to be supplied to the vehicle interior;
a condenser that releases heat from the refrigerant of high-temperature and high-pressure to condense the refrigerant; and
a switching unit capable of switching between a state where the refrigerant flows in a refrigerant circuit including the second water-refrigerant heat exchanger, the compressor, and the first water-refrigerant heat exchanger, and a state where the refrigerant flows in a refrigerant circuit including the evaporator, the compressor, the condenser, and the second water-refrigerant heat exchanger.

5. The vehicular air-conditioning device according to claim 1, further comprising:
a first control unit that performs operation control of the compressor; and
a second control unit that performs switching control of the switching unit, wherein
the first control unit and the second control unit are communicatively connected with each other.

6. The vehicular air-conditioning device according to claim 5, further comprising an air conditioning switch switchable between ON and OFF by a user, wherein
the first control unit is capable of transmitting air-conditioning switch information indicating ON or OFF of the air-conditioning switch to the second control unit, and
the second control unit is capable of transmitting a compressor start request to the first control unit.

7. The vehicular air-conditioning device according to claim 1, wherein the switching unit includes a three-way valve disposed at a branch portion where a refrigerant path from a discharge port of the compressor is branched into a refrigerant introduction side of the condenser and a refrigerant introduction side of the second water-refrigerant heat exchanger.

8. The vehicular air-conditioning device according to claim 5, wherein the second control unit receives information for determining a necessity of a heat pump heating mode, and transmits a compressor start request to the first control unit based on the information received.

9. The vehicular air-conditioning device according to claim 8, further comprising a heat pump heating switch switchable between ON and OFF by a user, wherein the information for determining the necessity of the heat pump heating mode includes switch information about the heat pump heating switch.

10. The vehicular air-conditioning device according to claim 1, further comprising a check valve disposed in a flow path where the refrigerant flows from the evaporator to the compressor.

11. The vehicular air-conditioning device according to claim 1, wherein the heat generating component is an internal combustion engine.

12. The vehicular air-conditioning device according to claim 1, wherein
the first water-refrigerant heat exchanger, the second water-refrigerant heat exchanger, and the switching unit are integrated into a unit, and
the compressor is provided outside the unit.

13. The vehicular air-conditioning device according to claim 5, wherein
the first water-refrigerant heat exchanger, the second water-refrigerant heat exchanger, the switching unit, and the second control unit are integrated into a unit, and
the compressor and the first control unit are provided outside the unit.

14. The vehicular air-conditioning device according to claim 1, wherein
the first water-refrigerant heat exchanger and the second water-refrigerant heat exchanger are integrated into a unit, and
the compressor is provided outside the unit.

15. The vehicular air-conditioning device according to claim 1, further comprising coolant pipe where the coolant flows between the first water-refrigerant heat exchanger and the second water-refrigerant heat exchanger, wherein the first water-refrigerant heat exchanger, the second water-refrigerant heat exchanger, and the coolant pipe are integrated with one another.

16. The vehicular air-conditioning device according to claim 15, further comprising a switching unit capable of switching between a state where the refrigerant flows in a refrigerant circuit that includes the second water-refrigerant heat exchanger, the compressor for compressing the refrigerant, and the first water-refrigerant heat exchanger, and a state where the refrigerant flows in another refrigerant circuit that includes the compressor.

17. The vehicular air-conditioning device according to claim 16, further comprising:
a connection portion connecting to a signal line for communication with the first control unit that outputs a signal for controlling the compressor; and
a second control unit communicatively connected with the first control unit via the connection portion to perform switching control of the switching unit.

18. The vehicular air-conditioning device according to claim 17, wherein the switching unit and the second control unit are integrated together with the first water-refrigerant heat exchanger and the second water-refrigerant heat exchanger.

19. The vehicular air-conditioning device according to claim 1, further comprising a water path switching unit that switches a route for a flow of the coolant, wherein the coolant circulates through the second water-refrigerant heat exchanger, the heater core, the first water-refrigerant heat exchanger, and the cooling path for cooling the heat generating component in this order when the water path switching unit is in a first switching state, and the refrigerant circulates through one of the first water-refrigerant heat exchanger and the second water-refrigerant heat exchanger, the other of the first water-refrigerant heat exchanger and the second water-refrigerant heat exchanger, the cooling path for cooling the heat generating component, and the heater core in this order when the water path switching unit is in a second switching state.

20. The vehicular air-conditioning device according to claim 19, further comprising a water path control unit that controls the water path switching unit, wherein the water path control unit controls the water path switching unit based on a temperature of the coolant or a pressure of the refrigerant.

21. The vehicular air-conditioning device according to claim 20, wherein the water path control unit performs control such that the water path switching unit gets into the second switching state when the temperature of the coolant is higher than a temperature threshold.

22. The vehicular air-conditioning device according to claim 20, wherein the water path control unit performs control such that the water path switching unit gets into the second switching state when the pressure of the refrigerant is higher than a pressure threshold.

* * * * *